F. FARQUHAR.
Agricultural Boiler.
No. 102,671.  Patented May 3, 1870.
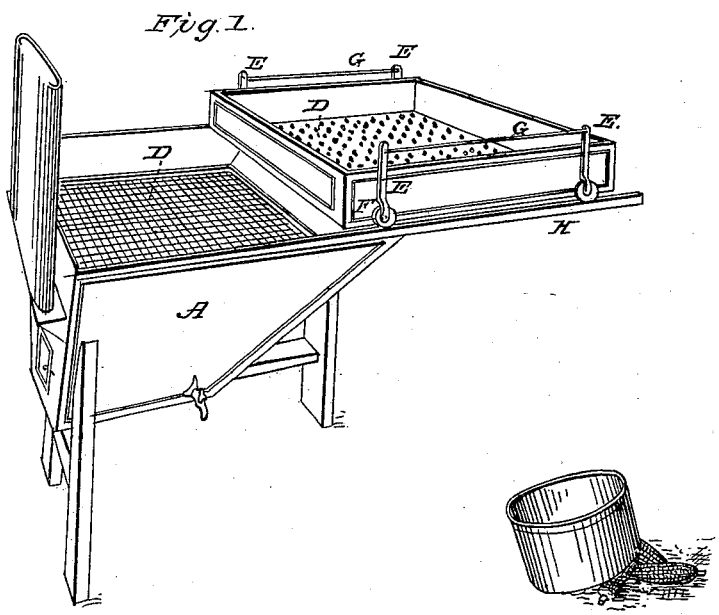
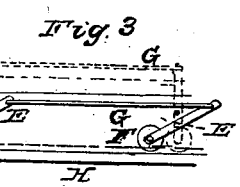
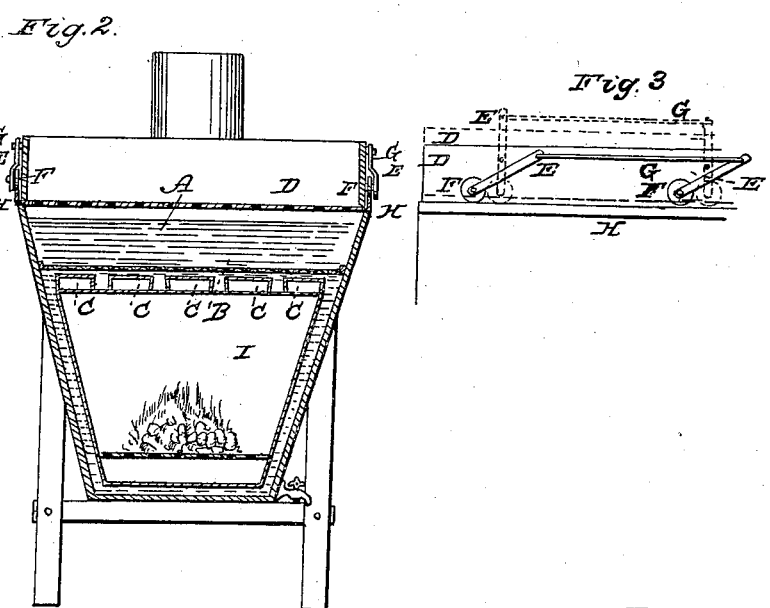
Witnesses
W. F. Spencer
Marcus Mott
Inventor
Francis Farquhar
Per Artemas Robert
Atty

UNITED STATES PATENT OFFICE.

FRANCIS FARQUHAR, OF RICHMOND, INDIANA.

AGRICULTURAL BOILER.

Specification forming part of Letters Patent No. 102,671, dated May 3, 1870.

*To all whom it may concern:*

Be it known that I, FRANCIS FARQUHAR, of Richmond, in the county of Wayne and State of Indiana, have invented certain Improvements in Apparatus for Cooking Feed for Animals, of which the following is a specification:

The first part of my invention relates to an improvement in evaporators or water-heaters in which the water passes over heated tubes or corrugations or around the fire-box; and consists in adapting such evaporators for use in cooking feed for animals by the use of a perforated or reticulated false bottom or pan, so placed as to support the feed in the water and prevent it from falling into recesses from which it would be difficult to remove, or from coming in contact with the fire-surface.

The second part of my invention relates to the arrangement of a steamer for use in cooking various kinds of feed, together with certain devices whereby it may readily be adjusted over the boiler or removed therefrom.

Description of Drawings.

Figure 1 is a perspective view of an evaporator with my improvements attached. Fig. 2 is a vertical section of the same; and Fig. 3 is a partial side elevation, showing the devices for elevating and removing the steamer.

General Description.

A represents a boiler, containing a fire-box, I, and flues C, so constructed that the water may pass around the fire-box and between the flues. B represents a false bottom or pan that is placed in the boiler immediately above the flues, and is perforated or reticulated to allow free circulation of the water. Grain or other material to be cooked is placed on this pan, and is thereby prevented from falling among the flues or from sticking to the surface of said flues or fire-box.

By means of this arrangement, these boilers, designed primarily as evaporators, may be applied to a new use, and a use in which they will prove exceedingly valuable.

D represents a steamer that fits closely upon the boiler A, and is provided with rollers F F, that are axled in pivoted levers E E. The levers E E are so arranged that when inclined, as shown in Fig. 3, the steamer is allowed to rest upon the top of the boiler A, while by raising them into a vertical position the rollers are brought into contact with the track H, slightly elevating the boiler, which may then be moved on the rollers along the track.

For convenience in operation, the levers E E are connected in pairs by the rods G G.

Having thus fully described my said invention, I do not claim, broadly, a perforated pan when used in ordinary boilers, the object of my invention being only to adapt a certain kind of water-heaters for cooking feed—a use to which they have not heretofore been put; but

I claim—

1. In an apparatus substantially as herein described, the perforated pan or false bottom B, arranged in the boiler A, in connection with the fire-box I, provided with flues C, as and for the purpose set forth.

2. The steamer C, pivoted levers E E, rollers F F, and track H, when constructed and operated substantially as described.

FRANCIS FARQUHAR.

Witnesses:
W. F. SPENCER,
W. B. HADLEY.